Nov. 21, 1961     G. F. ZIFFER     3,010,018
CONTROL SYSTEM

Filed April 2, 1959     2 Sheets-Sheet 1

*INVENTOR.*
GARRET F. ZIFFER
BY
ATTORNEY

Nov. 21, 1961 G. F. ZIFFER 3,010,018
CONTROL SYSTEM
Filed April 2, 1959 2 Sheets-Sheet 2

INVENTOR.
GARRET F. ZIFFER
BY Joseph Weingarten
ATTORNEY

United States Patent Office 3,010,018
Patented Nov. 21, 1961

3,010,018
CONTROL SYSTEM
Garret F. Ziffer, Wayland, Mass., assignor to Tracerlab, Inc., Waltham, Mass., a corporation of Massachusetts
Filed Apr. 2, 1959, Ser. No. 803,799
7 Claims. (Cl. 250—83.3)

The present invention relates in general to automatic process control, and more particularly to apparatus which provides, on an intermittent basis, a control for a process which is proportional to the measured deviation of some variable of the process from a predetermined value.

Automatic control systems for industrial production processes ordinarily include a closed loop with the production plant as an integral part thereof. The fundamental elements required for such a control loop in addition to the plant itself are a transducer, which measures a variable to be controlled; a comparator which compares the transducer measured value to a predetermined optimum value of the variable; a controller which converts the output of the comparator, expressed as a deviation from the predetermined set point, into a correction signal; and a control element which acts in response to the correction signal on the plant itself in such a manner as to restore the controlled process to set point value.

This type of control has been very effective in maintaining close tolerance in production processes which have essentially one critical variable subject to drift and amenable to a single control mechanism. For example, in industries such as paper manufacturing and plastic sheet manufacturing, process control systems employing radiation gauges as transducer elements have been frequently employed. In a radiation gauge control system the transducer includes a radiation source and a radiation detector element disposed in such a relation to the process material that the amount of radiation received at the detector from the source is a function of the thickness of the process material. The response of the detector may then be expressed as a current or may be converted into a mechanical position of some other element, such as the movable center arm on a slide wire potentiometer. Thus, the set point or desired value of thickness to be maintained can be expressed either as an electrical signal or a particular mechanical position. The output of the comparator unit, expressed as a deviation from this set point, can be converted by the controller into a correction signal which in turn is used to control the processed material.

What has been said above describes the elements in a process control system, but the specific mode of operation of these elements must depend on plant characteristics. One such mode is referred to as proportional action. In a proportional action process control system a disturbance which affects the plant is indicated at the transducer as a deviation from the set point, and through the controller a correction signal is developed which is proportional to the magnitude of this deviation. This signal is applied to the control element; hence, any change in transducer signal must cause a change proportional to it in the control element. A second mode of operation is called "proportional plus reset." This mode employs a proportional correction signal and an additional signal which is proportional to the integral of the correction signal for a chosen time constant.

While both of these modes achieve satisfactory results in plant systems which have a "simple lag," that is, require a period of time to respond fully to an applied correction, they do not provide satisfactory results in systems having a transportation delay. A transportation delay is occasioned, for example, by the transducer being physically separated from the control point, and manifests itself as providing no signal response to the applied correction until after the delay period has elapsed. Under these conditions the above modes either oscillate or provide too slow a correction, depending on the time constants selected.

With the foregoing limitations of process control systems in view, it is a primary object of the present invention to provide an interrupted electronic control in which the correction applied is proportional to the measured deviation, but which will not provide further correction during a time interval greater than the delay time of the process.

It is another object of the present invention to provide an apparatus capable of intermittently applying proportional control and having an alarm system to indicate either excessive control in a single correction, or that the aggregate of several control actions is excessive.

It is a further object of this invention to provide apparatus which applies control only when deviation in the process material occurs for a period of time longer than some predetermined minimum period.

It is still a further object of this invention to provide intermittent process control apparatus which is only actuated when the process material deviates beyond predetermined limits, but in which the correction applied is proportional to the deviation of the process material from a predetermined point value.

Broadly speaking, the present invention provides an intermittent electronic control for a process comprising a comparator circuit which measures the magnitude of the deviation of a transducer signal from a predetermined set point, a limit recognition unit which acts to provide an output only when the deviation exceeds predetermined limits, a proportional control unit which provides a gate pulse output whose duration is proportional to the deviation of the transducer signal from the set point, and a process line timer unit which prevents the initiation of action until a predetermined time has elapsed after the last prior action. The operation of this appaartus is such as to obviate the difficulties described above in systems having delay. By making the process line time delay longer than the delay between control element and transducer, the controller will remain ineffective until the correction has been made and the corrected material is under the transducer before again initiating control action and, since the correction supplied to the control element is proportional to the measured deviation, one corrective action will remedy any fixed level disturbance.

Alternatively, the novel control system may include a timer unit which provides that corrective action will only be initiated if a disturbance, as indicated by deviation at the transducer, is present for longer than a predetermined period, which insures that a minor, short-term variation will not initiate corrective action in the control element. Alarm systems may be provided, one of which algebraically adds the corrections applied to the control element so that if their total in any direction exceeds the safe limits of the control element, an indication of this condition is made evident. An alarm may also be indicated if a single correction exceeds a time corresponding to maximum duration of the proportioinal control gate.

These and other objects and advantages will become apparent from the following detailed description when taken in conjunction with the accompanying drawing in which.

Figure 1:
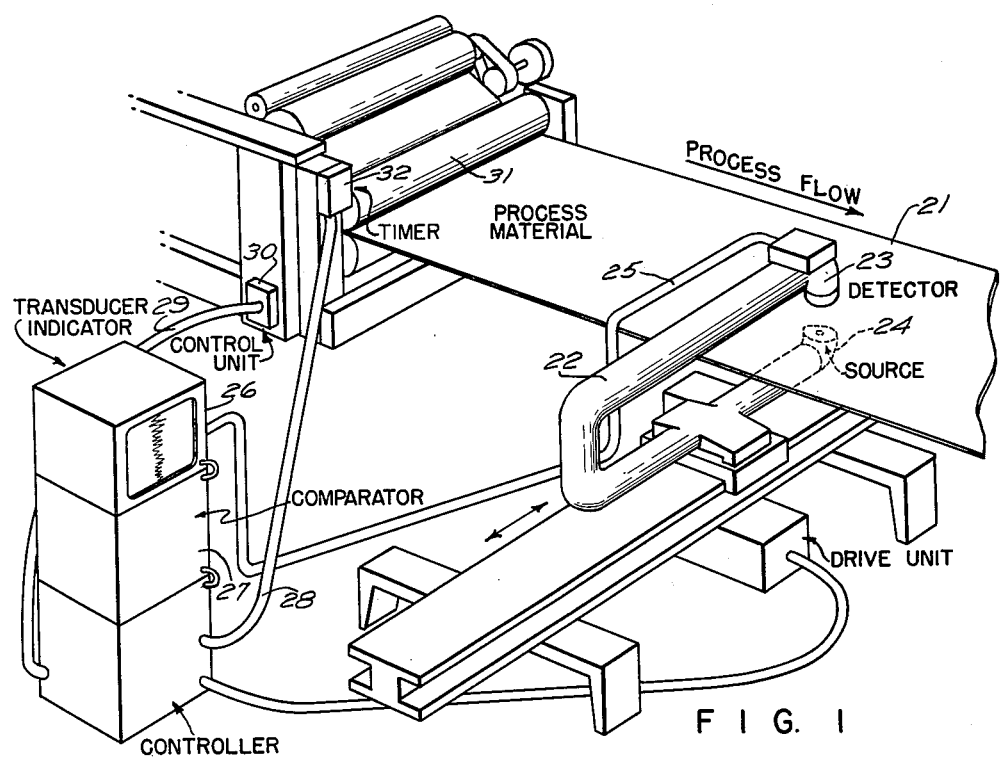
FIG. 1 is a diagrammatic view of a system embodying the principles of this invention.

FIG. 1 illustrates an apparatus for process control embodying the principles of this invention. Process material strip 21 is seen to flow from a producing plant through the jaws of transducer 22, which, as shown, may be a beta gauge provided with a radiation detector head 23 and a radiation source 24 located beneath the process material. The detector head 23 is electrically connected through cable 25 to transducer signal indicator unit 26, where variations in material mass are visually indicated. The transducer signal is electrically coupled from signal indicator 26 to comparator circuit 27, the output of which is in turn coupled to controller unit 28 which is electrically coupled through cable 29 to control element 30. The control element 30 adjusts the calender rolls 31 of the plant to maintain the set point thickness. Process line timer 32 monitors the flow of material and provides an enabling signal to controller unit 28 when sufficient material has passed through the timer after the correction to insure that material affected by the correction is within the jaws of transducer 22. This system has delay, namely, the time lag required for material to travel from the calender rolls to the gauge head.

A detailed description of the operation of those units which comprise the apparatus of this invention will be given below.

Figure 2:
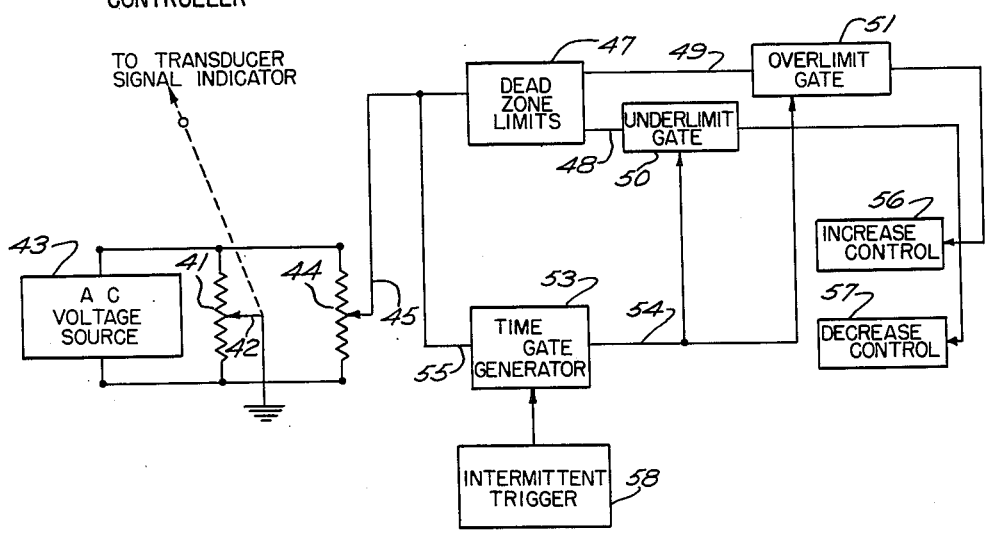
FIG. 2 is a block-schematic diagram of one embodiment of this invention.

Turning now to FIG. 2, there is diagrammatically illustrated one embodiment of the apparatus of this invention. A potentiometer 41, having a movable arm 42, is coupled across an alternating current voltage source 43. Arm 42 is electrically grounded and mechanically coupled, as indicated by the broken line, to an element in the transducer signal indicator; this coupling being such as to provide that arm 42 effectively follows variations in the transducer output signal. Potentiometer 44 is connected in parallel with potentiometer 41 and alternating current source 43. Arm 45 is electrically coupled to the dead zone limit unit 47, which provides two outputs on lines 48 and 49. Output 48 connects through under-limit gate 50 to decrease control unit 57, while output 49 connects through over-limit gate 51 to increase control 56. Potentiometer arm 45 is also coupled to input 55 of the time gate generator 53, the output of which is electrically coupled to both gates 50 and 51. The output of trigger unit 58 is coupled to the time gate generator 53.

Having described the interconnections of the key elements of this apparatus, their operation will now be explained.

Potentiometers 41 and 44 connected in parallel across A.C. voltage source 43 constitute a bridge circuit which presents on arm 45 a potential representing the deviation of the transducer signal from the reference source voltage. This reference voltage is preset to be equivalent to the optimum value of the process material by the positioning of arm 45 on potentiometer 44. This potential on arm 45 is presented to the dead zone limit unit 47 on the one hand, and on the other to time gate generator 53. Dead zone limit 47 has the function of recognizing the magnitude and direction of the difference between the transducer voltage and the reference voltage, energizing its output 48 when the limit is exceeded in a direction indicating too small a value of the process material, and energizing its output 49 when the direction is representative of too large a value of process material.

The magnitude of the voltage appearing on arm 45 required to generate an output from the dead zone limit is again a predetermined setting, since the function of this unit is to insure that no control action will be instituted when the variation of the material about set point is within a certain predetermined range. Output 48 is, as indicated, coupled through under-limit gate 50 to control decrease unit 57, while output 49 is coupled through over-limit gate 51 to control increase unit 56. Gates 50 and 51 are normally closed, i.e., non-transmitting, gates and are only opened upon receiving a signal from time gate generator unit 53.

Time gate generator unit 53 is a constant voltage, variable time, pulse generator in which the duration of the pluse is proportional to the amplitude of the voltage presented at input 55. This generator is a triggered unit which responds to a trigger pulse from intermittent trigger unit 58, which may be a periodic timer, or may provide a triggering signal in response to certain conditions of the process line.

Viewing then the overall operation of this unit, it is seen that action is initiated by a signal from the intermittent trigger and that if at this time the transducer signal deviates from set point, a gating pulse will be generated for a time proportional to the magnitude of this deviation, and that further, if this deviation is outside of the predetermined dead zone limits, one or the other of the control elements will be activated for a time proportional to the magnitude of the deviation from set point. At the end of this time no further action will be taken until another stimulus is received from the intermittent trigger. Further, if during the gating pulse the transducer returns within the dead zone limits, the control action ceases. Thus the overall effect is to provide an intermittent control proportional to the deviation observed at the transducer at a particular instant, but not requiring that the transducer observe the results of the corrective action before the corrective action ceases.

Figure 3:
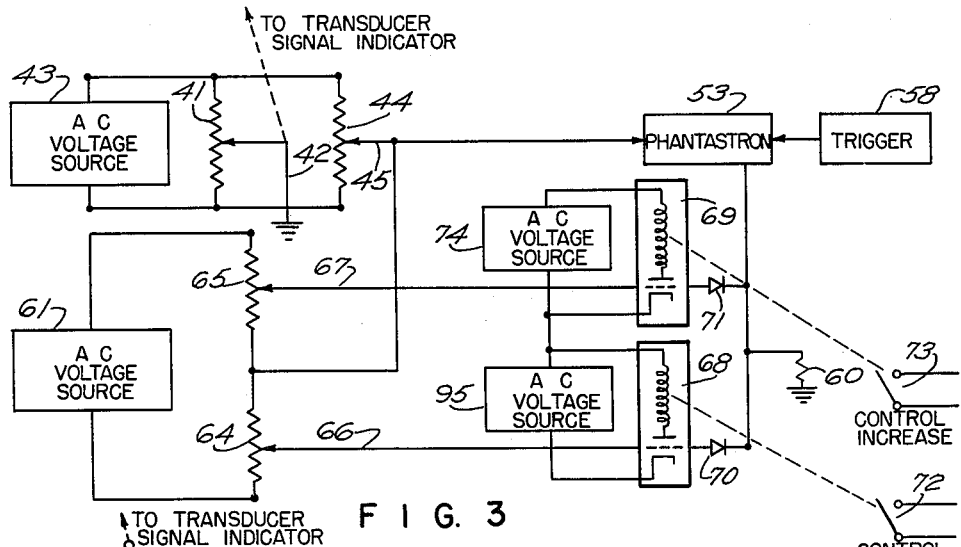
FIG. 3 is a detailed diagram of the embodiment of this invention as disclosed in FIGS. 1 and 2.

FIG. 3 is a diagram, partly in schematic form, indicating in more detail the elements of the above described preferred embodiment, in which like numbers are used to designate corresponding elements. It is seen that here again A.C. voltage source 43 is connected across potentiometers 41 and 44 in parallel, and that arm 42 of potentiometer 41 is electrically connected to ground but mechanically connected to the transducer signal indicator so as to form a slave element. In FIG. 3 dead zone limits are established by means of an A.C. bridge network comprising A.C. voltage source 61 connected across the serial combination of potentiometers 64 and 65. Arm 45 of potentiometer 44 is electrically coupled to the junction of potentiometers 64 and 65 which are equal valued. The setting of potentiometer arms 66 and 67 is used to determine the limits of the dead zone. Arm 66 is electrically coupled to the control grid of relay tube 68, while arm 67 is electrically coupled to the control grid of relay tube 69. Arm 45 of potentiometer 44 is coupled to the phantastron unit 53, which is also coupled to trigger unit 58. The output of phantastron 70 is applied as an enabling signal to both relays 68 and 69 through diodes 70 and 71, respectively. As indicated by the dotted lines, when relay 68 is activated, it effects a closure of contact point 72 which provides a decrease control, while when relay 69 is activated it effects a closure of contact point 73 to provide increase control.

Considering now in more detail the operation of this circuit, it should be understood that arm 45 of potentiometer 44 which has the function of determining the set point of the control is preset so that when the position of arm 42 on potentiometer 41 represents a transducer signal for the optimum value of the process material, there is no potential difference indicated on arm 45. However, when the transducer signal and hence arm 42 depart from this value, the potential on arm 45 is proportionate to the magnitude of this deviation from set point, and the phase of this potential difference is indicative of the direction of the deviation from set point.

Phantastron unit 53 is a circuit which upon triggering provides a constant voltage pulse, the duration of which is proportional to the amplitude of the input voltage and it is, as in the above functional description of this embodiment, triggered by intermittent trigger unit 58. The phantastron is not phase sensitive and hence will provide the same output regardless of the direction of the deviation from set point. Relay units 58 and 59 on the other hand are phase sensitive and will only be activated if the signal at their input is in phase with their A.C. power supplies 74 and 75, respectively, which in turn are out of phase with one another. The A.C. voltage source 61 is arranged to be in phase with A.C. voltage source 43. Since the center tap point is defined by arm 45 of set point potentiometer 44, arm 66 is effectively biased against signals of one phase while arm 67 (being set on the opposite side of the center tap from arm 66) is biased against signals of the opposite phase.

The phase sensitivity of relays 68 and 69 is arranged so that relay 68 is only sensitive to signals from arm 66 which are in such a phase as to be acting against the bias between arm 66 and tap 45, while the phase sensitivity of relay 69 is arranged so that it is only sensitive to signals which are in a phase such that they must overcome the bias between arm 67 and tap 45. These phase relationships form an effective A.C. bias system so that the magnitude of the potential developed on arm 45 must exceed the bias in order to trigger either one of the relays. Both relays 68 and 69 have their grids shunted to ground for positive pulses by diodes 70 and 71, in series with a relatively low resistance 60. Thus, an enabling signal in the form of a positive pulse to bias these diodes to non-conductance as well as an input signal is required in order to operate. This enabling signal is provided from phantastron 53 and hence the relays will operate only if both conditions are met, that is, a gate pulse is being produced by phantastron 53 and an input pulse is presented from the dead zone bridge circuit.

Figure 4:
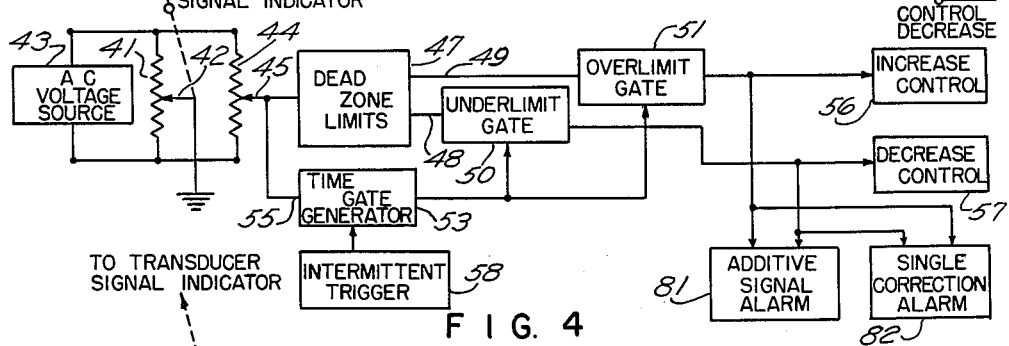
FIG. 4 is a block diagram illustrating an alternative embodiment of the apparatus of this invention.

With reference now to FIG. 4, there is shown in block diagram form the same embodiment indicated in FIG. 2; however, in this case, two additional units have been shown. These units are additive signal alarm 81 having an input from both the control increase unit 56 and control decrease unit 57, and the single correction alarm unit 82 which is also provided with inputs from both increase and decrease control elements. The function of these alarms is to prevent the control elements, either in a single or in a series of corrections, from being driven beyond their safe limits. This is accomplished in the case of the single correction alarm unit by means of a timer which is set at a time corresponding to the maximum duration of the gate pulse and if either one of the control elements 56 or 57 is activated continuously for a period exceeding that time, an alarm output is provided. The additive signal alarm is a unit capable of algebraically adding the amount of increasing and decreasing control action applied so that if after any number of corrections the total algebraic sum exceeds the safe limits in either direction, an alarm is also sounded. This latter unit might, for example, be a bi-directional motor which is driven in one direction by activation of the increase control element and in the other by activation of the decrease control element and which is preset to render an alarm if a cam attached to its shaft travels 180° in either direction.

The above described embodiments provide a proportional control apparatus not subject to the oscillation problem experienced with prior art devices and subject only to the limitation that the apparatus must be re-triggered only after an interval which is longer than the time required for the process material to travel from the point where the control action is effected to the point where the transducer is located, which interval constitutes the pure delay of the process plant.

An alternative embodiment of the control apparatus of this invention includes a provision whereby control action is only initiated if the transducer signal exceeds the dead zone limits for a predetermined period of time. This feature, which is termed a pre-lag, provides more efficient control since, despite the limitation that the control apparatus is inactive for at least a period equal to the delay after any action has been initiated, the system will not remain inactive for a delay period when a transitory excursion beyond the dead zone limit occurs.

Figure 5:
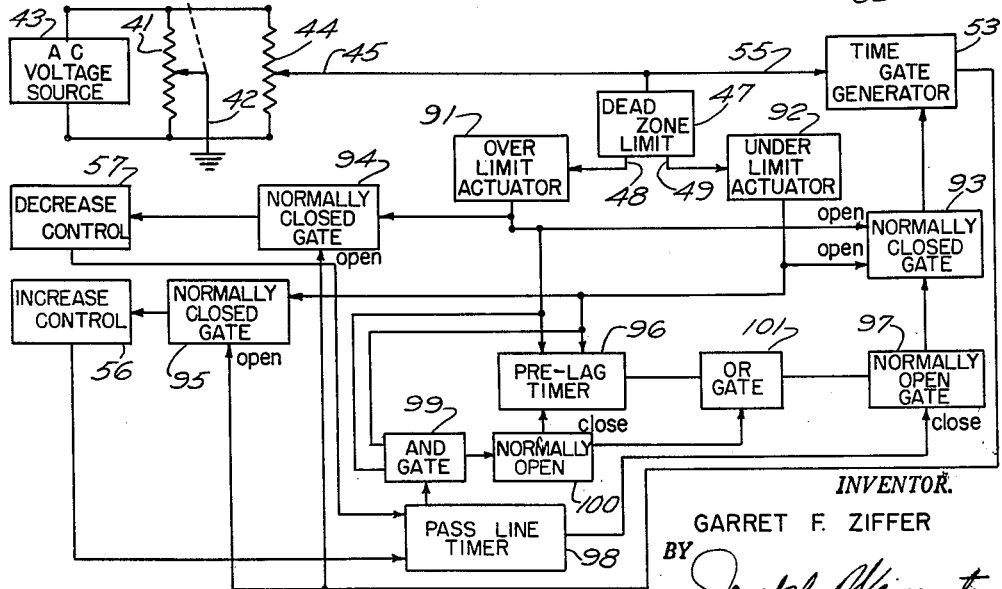
FIG. 5 is a block diagram illustrating another embodiment of this invention.

Referring now to FIG. 5, there is diagrammatically illustrated a third embodiment of this invention which includes pre-lag operation, with like reference numbers again designating like parts of the previous figures. Here again an output potential on arm 45 represents the deviation of the transducer signal from set point. As before, this output is provided both to the input 55 of time gate generator 53 and the input of dead zone limit unit 47. If the potential on arm 45 exceeds the preset dead zone limit in one direction, output 48 is energized, while if the potential on arm 45 exceeds the limit in the opposite direction, output 49 is energized; but in this embodiment, output 48 connects to over-limit actuator 91 and output 49 is electrically coupled to under-limit actuator 92. Actutator 91 and actuator 92 only require that their respective inputs be energized in order to provide an output signal, which is maintained as long as the dead zone limit is exceeded. The outputs of both over-limit actuator 91 and under-limit actuator 92 are coupled to gate 93 which is normally closed and the actuator output acts as an opening signal in this case. The output of over-limit actuator 91 is also coupled through gate 94, which is normally closed, to decrease control element 57 and the output of under-limit actuator 92 is coupled through gate 95, which is normally closed, to increase control element 56. The outputs of these two actuators are also coupled into pre-lag timer unit 96, which is connected through "or" gate 101 and normally open gate 97 and gate 93 to time gate generator 53. The output of time gate generator 53 is applied to gates 94 and 95.

In this embodiment the operation is as follows. When the potential at arm 45 exceeds the dead zone limit, one of the two actuators 91 or 92 is energized and, upon this occurrence, the pre-lag timer 96 starts to run. Pre-lag timer 96 is an electronic timer which runs for a preset period of time and thereafter provides an output signal. The exact duration of this time is a matter of choice, depending upon the particular circumstances of the process and the amount of time which represents only a transitory excursion. If this pre-lag unit completes its timing cycle while either of the limit actuators remains energized it applies a signal through normally open gate 97 and normally closed gate 93, which by virtue of the actuator signal is now open, to initiate a pulse from time gate generator 53. Generator 53 upon receiving this initiating signal will provide a constant voltage output pulse having a duration proportional to the magnitude of the voltage presented at its input. This output is coupled to both gates 94 and 95 and provides an opening signal for the duration of the time gate generator output. Hence, depending upon whether the over-limit actuator 91 or the under-limit actuator 92 is energized, a signal is applied through one of these two gates 94 and 95 to either control elements 57 or 56 respectively, but, should the transducer signal return within the dead zone limit or should the time gate generator output pulse terminate, no further signal is applied to the control elements 56 and 57. Outputs are provided from both decrease control 57 and increase control 56 to pass line timer 98. This unit is arranged to start timing when either of the control elements 56 or 57 has been actuated and is then de-actuated. While it is in the process of running it provides as an output an open signal to gate 97, which is otherwise normally closed, thereby preventing a second initiation of time gate generator 53. The pass line timer 98 is arranged to have a predetermined run-out time longer than the pure delay experienced in the plant and therefore serves the function of preventing corrective actions from occurring within one delay period of the last previous corrective action. Pass line timer 98 also provides at the end of its cycle a pulse to "and" gate 99. The outputs from actuators 91 and 92 are applied to the second input of this "and" gate. The output of this gate is applied through normally open gate 100 to "or" gate 101. Gate 100 receives a close signal whenever the pre-lag timer is actuated. This sequence of gates (99, 100, and 101) provide for the situation which occurs when the pre-lag timer starts and finishes a cycle, while the pass line timer has closed gate 97. Provided that actuator 91 or 92 remains energized, it is desirable to initiate a correction at the end of the pass line timer cycle, but since the pre-lag timer has already finished, another pulse must be obtained to initiate time gate generator 53. This pulse is obtained if the end of the pass line timer cycle occurs while one of the actuators remains energized. Gate 100 prevents this pulse from initiating generator 53, if it occurs during a cycle of the pre-lag timer.

Referring back to FIG. 1, a process control system embodying this invention is illustrated. While the transducer shown is a radiation gauge, it should be realized that the invention will operate with any transducer, provided only that a delay exists between the action of the control element and the sensing of the resultant modification by the transducer. In FIG. 1 the plant is shown as a roller mill plant, but here also, it should be realized that this invention applies to any process plant which has the capability of automatic control. Specific embodiments have been shown in FIGS. 2, 3, 4, and 5 for the comparator and controller units as well as associated alarm units, but these are intended to serve as specific examples and in view of the fact that numerous modifications and departures may now be made by those skilled in the art, the invention herein should be construed as limited only by the spirit and scope of the appended claims.

What is claimed is:

1. Control apparatus comprising a transducer member furnishing an electrical potential that varies in magnitude with changes in a variable condition to be controlled, a first reference source of electrical potential having a predetermined level, a comparator circuit connected to the output voltage of said transducer member and to said first reference source and providing as an output the potential difference between the voltage of said transducer member and said first reference source with a polarity determined by the direction of the imbalance, a time pulse generator having an input energized by the output voltage of said comparator and adapted to provide in response to an applied stimulus an output pulse having a duration which is a linear function of the amplitude of its input voltage, means for periodically providing a stimulus to said time pulse generator, limit recognition means having an input energized by the output potential of said comparator and having first and second output terminals, said first output terminal being energized when the output voltage of said comparator exceeds a predetermined magnitude and is of one polarity, said second output terminal being energized when the output voltage of said comparator exceeds a predetermined magnitude and is of opposite polarity, control means adapted to bring about changes in said variable conditions in a sense to balance the potential of said transducer member and said reference source, said control means being energized to operate in one direction by the coincidence of the output pulse of said time pulse generator and the energization of said first output terminal, said control means being energized to operate in an opposite direction by the coincidence of the output pulse of said time pulse generator and the energizing of said second output terminal.

2. Control apparatus comprising a transducer member which develops an A.C. potential that varies in magnitude with changes in a variable condition to be controlled, a first reference source of A.C. potential, having a predetermined level and opposite phase to the potential produced by the transducer member, a comparator circuit connected to the output voltage of the said transducer member and to said first reference source and providing as an output the potential difference therebetween with a phase determined by the direction of the imbalance, a time pulse generator having an input energized by the output voltage of said comparator and adapted to provide in response to an applied stimulus an output pulse having a duration which is a linear function of the amplitude of its input voltage, means for intermittently providing a stimulus to said time pulse generator, second and third reference sources of A.C. potential having predetermined levels and opposite phase with respect to said third reference source, first and second actuating means, said first actuating means being energized when said comparator circuit output voltage is larger in magnitude and opposite in phase to the potential of said second reference source, said second actuating means being energized when said comparator circuit output voltage is larger in magnitude and opposite in phase to the potential of said third reference source, control means adapted to bring about changes in said variable condition in a sense to balance the potential of said transducer member and said first reference source, said control means being energized to operate in one direction upon coincidence of the output pulse of said time pulse generator and the energizing of said first actuating means, said control means being energized to operate in an opposite direction upon coincidence of the output pulse of said time pulse generator and the energizing of said second actuating means.

3. Apparatus in accordance with claim 2 having alarm means adapted to provide an alarm signal whenever the sum of operations of said control means in one direction exceeds a predetermined limit.

4. Control apparatus comprising a transducer member furnishing an A.C. potential variable in magnitude with changes in a variable condition to be controlled, a first reference source of A.C. potential having a predetermined level and opposite phase to the potential produced by the transducer member, a comparator circuit connected to the output voltage of the said transducer member and to said first reference source and providing as an output the potential difference between the voltage of said transducer member and said first reference source with a phase determined by the direction of the imbalance, a time pulse generator having an input energized by the output voltage of said comparator and adapted to provide in response to an applied stimulus an output pulse having a duration which is a linear function of the amplitude of the input voltage, second and third reference sources of A.C. potential having predetermined levels and opposite phase, first and second actuating means, said first actuating means being energized when said comparator circuit output voltage is larger in magnitude and opposite in phase to the potential of said second reference source, said second actuating means being energized when said comparator circuit output voltage is larger in magnitude and opposite in phase to the potential of said third reference source, coupling means for applying the output of said first and said second actuating means as a stimulus to said time pulse generator, control means adapted to bring about changes in said variable condition in a sense to balance the potential of said transducer member and said first reference source, said control means being energized to operate in one direction upon coincidence of the output pulse of said time pulse generator and the energizing of said first actuating means, said control means being energized to operate in an opposite direction upon coincidence of the output pulse of said time pulse generator and the energizing of said second actuating means, means responsive to the de-energization of said control means to prevent said stimulus from initiating operation of said time pulse generator for a time period, said period having a duration sufficient to allow the affected change in said variables to be sensed at said transducer.

5. Control apparatus comprising a transducer member furnishing an A.C. potential variable in magnitude with changes in a variable condition to be controlled, a first reference source of A.C. potential having a predetermined level and opposite phase to the potential produced by the transducer member, a comparator circuit connected to the output voltage of the said transducer member and to said first reference source and providing as an output the potential difference between the voltage of said transducer member and the first reference source with a phase determined by the direction of the imbalance, second and third reference sources of A.C. potential having predetermined levels and opposite phase, first and second actuating means, said first actuating means being energized when said comparator circuit output voltage is larger in magnitude and opposite in phase to the potential of said second reference source, said second actuating means being energized when said comparator circuit output voltage is larger in magnitude and opposite in phase to the potential of said third reference source, timer means responsive to the energizing of either of said first or said second actuating means and adapted to provide an output signal at the end of a predetermined time period after energization, a time pulse generator having an input energized by the output voltage of said comparator and adapted to provide in response to an applied stimulus an output pulse having a duration which is a linear function of the amplitude of its input voltage, means for applying a stimulus to said time pulse generator upon coincidence of the energization of said actuating means which initiated said timer means and said signal from said timer means, control means adapted to bring about changes in said variable conditions in a sense to balance the potential of said transducer member and said reference source, said control means being energized to operate in one direction by the coincidence of the output pulse of said time pulse generator and the energizing of said first actuating means, said control means being energized to operate in an opposite direction by the coincidence of the output pulse of said time pulse generator and the energizing of said second actuating means, means responsive to the de-energization of said control means to prevent said stimulus from initiating another operation of said time pulse generator for a time period, said period having a duration sufficient to allow the affected change in said variable to be sensed at said transducer.

6. Control apparatus comprising a transducer member furnishing an A.C. potential variable in magnitude with changes in a variable condition to be controlled, a first reference source of A.C. potential having a predetermined level selected in accordance with an optimum value of the condition to be controlled, said first reference source being connected to produce opposite phase to the potential produced by said transducer member, a comparator circuit responsive to the output voltage of said transducer member and to said first reference source and providing as an output the potential difference therebetween, with a phase determined by the direction of the imbalance, a time pulse generator having an input energized by the output voltage of said comparator and adapted to provide in response to an applied stimulus an output pulse having a duration which is a linear function of the amplitude of its input voltage, means for periodically providing a stimulus to said time pulse generator, second and third reference sources of A.C. potential having predetermined levels selected to correspond to acceptable limits of deviation of the controlled variable from said optimum value, said second reference source being opposite in phase to said third reference source, first and second actuating means, said first and second actuating means being enabled by the output pulse from said time pulse generator, said first actuating means being energized when said comparator circuit output voltage is larger in magnitude and opposite in phase to the potential of said second reference source, said second actuating means being energized when said comparator circuit output voltage is larger in magnitude and opposite in phase to said third reference source, control means adapted to bring about changes in said variable condition in a sense to balance the potential of said transducer member and said first reference source, said control means being energized to operate in one direction upon energization of said first actuating means, said control means being energized to operate in the opposite direction upon energization of said second actuating means.

7. Control apparatus comprising a beta gauge transducer providing as an output a signal proportional to a parameter of material to be controlled, means for converting said output signal into an A.C. potential which varies in magnitude with changes in said output signal, a first reference source of A.C. potential, said reference source being established at a value equal to the A.C. potential derived from said beta gauge transducer at a predetermined value of said parameter, a comparator circuit responsive to the A.C. potential derived from said beta gauge transducer and to said first reference source and providing as an output the potential difference between said reference source and the voltage derived from said transducer, a time pulse generator having an input energized by said output voltage from said comparator circuit and adapted to provide in response to an applied stimulus an output pulse having a duration which is a linear function of the amplitude of its input voltage, means for periodically providing a stimulus to said time pulse generator, second and third reference sources of A.C. potential having predetermined levels and opposite phase, first and second actuating means, said first actuating means being energized when said comparator circuit output voltage is larger in magnitude and opposite in phase to said second reference source, said second actuating means being energized when said comparator circuit output voltage is larger in magnitude and opposite in phase to said third reference source, control means adapted to bring about changes in said parameter in a sense to balance the potential derived from said beta gauge transducer and the potential of said first reference source, said control means being energized to operate in one direction by the coincidence of the output pulse of said time pulse generator and the energizing of said first actuating means, and said control means being energized to operate in the opposite direction by the coincidence of the output pulse of said time pulse generator and the energizing of said second actuating means.

References Cited in the file of this patent
UNITED STATES PATENTS

| | | |
|---|---|---|
| 2,653,247 | Lunddahl | Sept. 22, 1953 |
| 2,737,186 | Molens | Mar. 6, 1956 |
| 2,750,986 | Russell et al. | June 19, 1956 |
| 2,884,531 | Basch | Apr. 28, 1959 |